US011572298B2

(12) United States Patent
Scoggins et al.

(10) Patent No.: US 11,572,298 B2
(45) Date of Patent: Feb. 7, 2023

(54) MOLDS THAT INCLUDE A CERAMIC MATERIAL SURFACE, AND RELATED METHODS FOR MAKING AND USING THE MOLDS

(71) Applicant: ENTEGRIS, INC., Billerica, MA (US)

(72) Inventors: Troy Scoggins, Decatur, TX (US); Christopher James Yannetta, Fort Worth, TX (US)

(73) Assignee: ENTEGRIS, INC., Billerica, MA (US)

( * ) Notice: Subject to any disclaimer, the term of this patent is extended or adjusted under 35 U.S.C. 154(b) by 887 days.

(21) Appl. No.: 16/392,132

(22) Filed: Apr. 23, 2019

(65) Prior Publication Data

US 2019/0345052 A1 Nov. 14, 2019

Related U.S. Application Data

(60) Provisional application No. 62/670,070, filed on May 11, 2018.

(51) Int. Cl.
| | | |
|---|---|---|
| *C03B 11/08* | (2006.01) | |
| *B29C 33/38* | (2006.01) | |
| *C04B 35/56* | (2006.01) | |
| *C04B 35/58* | (2006.01) | |
| *C03B 19/02* | (2006.01) | |
| *C04B 35/584* | (2006.01) | |
| *C04B 35/581* | (2006.01) | |
| *C03C 3/04* | (2006.01) | |
| *C04B 35/622* | (2006.01) | |

(52) U.S. Cl.
CPC ............... *C03B 19/02* (2013.01); *C03C 3/04* (2013.01); *C04B 35/5615* (2013.01); *C04B 35/5618* (2013.01); *C04B 35/581* (2013.01); *C04B 35/584* (2013.01); *C04B 35/58014* (2013.01); *C04B 35/62222* (2013.01); *C04B 2235/3826* (2013.01); *C04B 2235/3843* (2013.01); *C04B 2235/3865* (2013.01); *C04B 2235/3873* (2013.01); *C04B 2235/3886* (2013.01); *C04B 2235/9669* (2013.01)

(58) Field of Classification Search
CPC .............................. C03B 11/084; B29C 33/38
See application file for complete search history.

(56) References Cited

U.S. PATENT DOCUMENTS

| | | | | |
|---|---|---|---|---|
| 4,139,677 A | * | 2/1979 | Blair ....................... | C03B 40/02 |
| | | | | 65/32.5 |
| 5,626,641 A | * | 5/1997 | Yonemoto ............... | C03B 19/02 |
| | | | | 65/374.13 |
| 6,231,969 B1 | * | 5/2001 | Knight ..................... | C23C 4/10 |
| | | | | 428/697 |
| 6,461,989 B1 | * | 10/2002 | El-Raghy ............ | C04B 35/6365 |
| | | | | 501/87 |
| 7,217,907 B2 | * | 5/2007 | El-Raghy ................. | C23C 4/10 |
| | | | | 428/698 |
| 9,023,246 B2 | | 5/2015 | Canel et al. | |
| 9,856,176 B2 | | 1/2018 | Harris et al. | |
| 2004/0265405 A1 | * | 12/2004 | Akyuz ...................... | B22F 3/03 |
| | | | | 425/78 |
| 2006/0088435 A1 | | 4/2006 | Gupta et al. | |
| 2006/0202389 A1 | * | 9/2006 | El-Raghy ........... | A41D 19/0055 |
| | | | | 425/269 |
| 2007/0021290 A1 | * | 1/2007 | Gromelski .............. | C04B 35/56 |
| | | | | 501/87 |
| 2019/0077690 A1 | | 3/2019 | Scoggins | |

FOREIGN PATENT DOCUMENTS

| | | |
|---|---|---|
| CN | 101734913 A | 6/2010 |
| CN | 107916349 B | 9/2019 |
| EP | 1456149 B1 | 6/2010 |
| JP | 2007099598 A | 4/2007 |
| JP | 2011246308 A | 12/2011 |
| JP | 2011253651 A | 12/2011 |
| TW | 200603919 A | 2/2006 |
| WO | 2017152952 A1 | 9/2017 |
| WO | WO-2017152592 A1 * | 9/2017 |

OTHER PUBLICATIONS

Wang Yingjun, "Novel Materials Science and Technology," South China University of Technology Press, 2006.

* cited by examiner

Primary Examiner — Karl E Group

(57) ABSTRACT

Described are molds that include a ceramic material at a surface, as well as methods of forming the molds, and methods of using the molds; the ceramic material is constituted substantially, mostly, or entirely of three elemental components designated M, A, and X; the "M" component is at least one transition metal; the "A" component is one or a combination of Si, Al, Ge, Pb, Sn, Ga, P, S, In, As, Tl, and Cd; and the "X" component is carbon, nitrogen, or a combination thereof.

19 Claims, No Drawings

MOLDS THAT INCLUDE A CERAMIC MATERIAL SURFACE, AND RELATED METHODS FOR MAKING AND USING THE MOLDS

CROSS-REFERENCE TO RELATED APPLICATIONS

This application claims the benefit under 35 USC 119 of U.S. Provisional Patent Application No. 62/670,070, filed May 11, 2018, the disclosure of which is hereby incorporated herein by reference in its entirety for all purposes.

FIELD OF THE INVENTION

The following description relates to molds that include a ceramic material at a surface, as well as to methods of forming the molds and methods of using the molds.

BACKGROUND

Today's commercial glass processing technologies include a large variety of methods, techniques, devices such as molds, and glass formulations, that may be used in various combinations to produce a wide range of glass materials for a multitude of different types of shaped glass products (a.k.a. "shaped glass items"). Common methods to form glass products are typically done by heating a glass material to a softening point, using a mold or shaping instrument to form the glass into a desired shaped glass item, and allowing the formed glass item to cool.

One glass technology that is used to produce glass items that have particularly desirable physical properties is the process of forming and molding shaped glass items made from formulations known as alkali-aluminosilicate glass. Alkali-aluminosilicate glass is a lightweight, strong, and highly scratch resistant glass material that finds application, for example, as a cover glass for electronic devices, including mobile phones, portable media players, portable computer displays, and television screens.

To prepare a shaped glass item made from alkali-aluminosilicate glass, a mold can be used. Typical molding methods generally involve using the mold to form a shaped glass item from aluminosilicate glass, removing the shaped glass item from the mold, and then chemically converting the shaped glass item of aluminosilicate glass into a shaped glass item of alkali-aluminosilicate glass by chemical treatment in a molten salt bath.

A shaped glass item such as a cover glass must have a precision finish, i.e., a highly regular finish that is highly precise and essentially defect-free finish. A mold used to form the precision finish must also have a precision finish. The mold must be essentially free of defects during use, i.e., must not contain pits, scratches, voids, or other faults or defects that would be more than a tolerable amount when transferred to a precision molded glass item such as a cover glass.

The mold should also be highly durable, e.g., remain effectively free of defects for a useful lifetime of forming many hundreds or (preferably) thousands of shaped glass items, preferably many hundreds or thousands of shaped glass items having a precision finish, for example shaped glass items in the form of a cover glass.

One type of mold that can be machined to an effectively defect-free finish and that is durable is a metal mold. Metal molds, however, are difficult to form into a shaped mold body and are, therefore, expensive. Due to their high cost, metal molds are not often used for many consumer precision glass products because the product cycle is insufficiently long to justify the high cost of the metal mold; the metal mold is not cost effective.

Instead of an expensive metal mold, molds for forming precision glass items have been made of graphite. Graphite is a useful material for mold bodies because glass tends to not stick to graphite, because graphite is relatively inexpensive, and because graphite can be efficiently machined to form a mold body with high precision (relatively defect-free) three-dimensional mold features.

Despite the advantages of graphite as a mold body material, graphite has at least one noteworthy shortcoming in this application, which is that graphite is susceptible to oxidation at temperatures at which glass-molding operations occur. To change the shape of glass, e.g., by molding, the glass must be heated to a very high temperature, for example to a temperature of at least 400° C., at which temperature the glass softens to a degree that allows the softened glass to be re-shaped using the mold. Temperatures in this range can cause rapid oxidation of graphite of a mold body if the molding process is performed in air or another oxygen-containing atmosphere.

To prevent oxidation of graphite of a mold body at glass-softening temperatures, various oxidation-resistant coatings have been placed at surfaces of graphite mold bodies. See, for example, International PCT Publication No. WO/2017/011315 (International Application No. PCT/US2016/041554), which describes graphite mold bodies coated with a titanium-containing coating and an yttria coating. These and other types of coatings for graphite mold bodies are designed to be oxidation resistant, but will nonetheless suffer oxidation if used for a sufficient amount of time or for a sufficient number of cycles of forming a shaped glass item. Even very small amounts of oxidation during a molding step can damage a surface of one of these coatings by producing a pit, pinhole, "dimple," asperity, or other defect that can be transferred to a surface of a molded glass piece formed by the mold. The damage can accumulate over many uses of the mold to a degree that ends the usefulness of the mold and requires replacement of the mold.

To prevent oxidation of a graphite mold or a coating on a graphite mold surface, a process of using the mold may be performed in an oxygen-reduced (preferably "oxygen-free") atmosphere, e.g., an atmosphere that contains less than 1, 0.5, or 0.1 percent oxygen. A common example of an "oxygen-free" atmosphere used to form glass in a graphite or coated graphite mold is a concentrated nitrogen atmosphere, meaning, for example, an atmosphere that contains at least 95, 99, 99.5, or 99.9 percent nitrogen, While various types of molds are presently available and useful for forming shaped glass items, including precision glass items such as cover glass products for electronic devices, there is ongoing need for improvements in glass forming methods. These improvements can be in the form of improved glass molds, desirably including glass molds that are relatively easy to form (e.g., by machining) and, therefore, can be prepared in a cost effective manner, and that additionally have reduced susceptibility to oxidation and, consequently, can be used repeatedly for an extended useful lifetime of forming precision molded shaped glass items.

SUMMARY

The present invention relates to molds adapted to be used for forming articles that include shaped glass items. A glass mold of this description includes a surface made of ceramic material that is constituted substantially, mostly, or entirely of three elemental components designated M, A, and X. The "M" component is at least one transition metal; the "A" component is one or a combination of Si, Al, Ge, Pb, Sn, Ga, P, S, In, As, Tl, and Cd; and the "X" component is carbon, nitrogen, or a combination thereof. The relative amounts of the M, A, and X elemental components can be as desired and as useful for producing a stable ceramic material that can be formed into a surface of a mold body, and that functions effectively as a surface of a mold body, such as for forming glass using the mold.

The description also relates to methods of forming a mold that includes a mold body (e.g., a graphite mold body) and a surface of the ceramic material by depositing the ceramic material onto a surface of the mold body by any of various useful methods, e.g., by chemical vapor deposition, atomic layer deposition, physical vapor deposition (including reactive physical vapor deposition), spray coating, aerosol deposition, etc.

For molds used commercially to prepare shaped glass items, the mold should desirably have a long lifetime, meaning that the mold can be used to form many hundreds or thousands of shaped glass items from the mold without the mold becoming no longer suitable for use due to degradation or wear. Molds for forming glass can become degraded due to oxidation of the mold caused by the presence of oxygen in an atmosphere used in a glass forming or shaping step that involves the mold. Many glass forming steps are performed in an atmosphere of reduced oxygen, such as in the presence of highly-concentrated nitrogen. But even highly-concentrated nitrogen or other inert atmospheres may contain a small amount of oxygen that can cause oxidation of the mold.

Molds of the present description include surfaces made of ceramic material as described, which is resistant to oxidation. The ceramic material provides an oxidation-resistant coating for the mold, and, in a mold that includes a graphite mold body underlying the ceramic material, protects that graphite body from oxidation.

Thus, certain example molds include a graphite mold body having a layer of ceramic material deposited over the surface of the mold body. In certain embodiments, the layer of ceramic material completely covers, e.g., encapsulates, the entire surface of the graphite mold body. The coating can substantially reduce the extent of oxidation of the underlying graphite mold body surface during glass molding, as compared to the amount of oxidation of the graphite that would result if the same graphite mold body were used in the absence of the ceramic material layer. The coating can also, preferably, provide a release, or non-stick, surface to prevent, at least to a large extent, softened glass (and a resultant solidified shaped glass item) from sticking to the mold body surface, thereby preventing or reducing the likelihood of the creation of defects in a shaped glass item produced by the mold during glass molding and release operations, e.g., compared to the extent of sticking that would occur if the same molded shaped glass item were formed using the same mold body surface in the absence of the ceramic material coating.

In example mold embodiments, a precision glass mold can be made by depositing ceramic material onto a surface of a graphite mold body by a method such as chemical vapor deposition, atomic layer deposition, physical vapor deposition (including reactive physical vapor deposition), spray coating, aerosol deposition, etc.

In one aspect the invention relates to a mold that includes a surface made of a ceramic material of formula (I), a ceramic material of formula (II), or a ceramic material that contains both ceramic material of formula (I) and ceramic material of formula (II). Formula (I) is as follows:

$$M_2A_1X_1 \qquad (I)$$

wherein
  M is at least one transition metal,
  A is selected from Si, Al, Ge, Pb, Sn, Ga, P, S, In, As, Tl and Cd, and combinations thereof, and
  X is carbon, nitrogen, or a combination thereof.
Formula (II) is as follows:

$$M_3A_1X_2 \qquad (II)$$

wherein
  M is at least one transition metal,
  A is selected from one of Al, Ge, and Si, and combinations thereof, and
  X is carbon, nitrogen, or a combination thereof.

In another aspect the invention relates to a method of forming a shaped glass item. The method includes: softening aluminosilicate glass and placing the softened aluminosilicate glass in contact with one or more mold features of a mold as described.

In yet another aspect the invention relates to a method of forming a mold that includes a mold body and a ceramic material surface. The method includes depositing onto the mold body: ceramic material having formula (I), ceramic material having formula (II), or a combination of ceramic material having formula (I) and ceramic material having formula (II).

DETAILED DESCRIPTION

The following is a description of molds adapted to be used for forming articles, for example articles made of glass. A mold of this description includes a surface made of ceramic material that is constituted substantially, mostly, or entirely of three elemental components designated M, A, and X. The "M" component is at least one transition metal; the "A" component is one or a combination of Si, Al, Ge, Pb, Sn, Ga, P, S, In, As, Tl, and Cd; and the "X" component is carbon, nitrogen, or a combination thereof. The relative amounts of the M, A, and X elemental components can be as desired and as useful for producing a stable ceramic material that can be formed into a mold surface, and that functions effectively as a surface of a mold, such as for forming glass using the mold.

The description also relates to example methods of forming a mold that includes a mold body (e.g., a graphite mold body) and a surface of the ceramic material by depositing the ceramic material onto a surface of the mold body by any of various useful methods, e.g., by chemical vapor deposition, atomic layer deposition, physical vapor deposition (including reactive physical vapor deposition), spray coating, aerosol deposition, etc.

The ceramic material is of a type of ceramic materials sometimes referred to as "ternary" ceramic materials or a "MAX" ceramic materials, these designations being based on the three-element composition of the ceramic material, i.e., the three elements being designated "M" for a transition metal; "A" for an element selected from Si, Al, Ge, Pb, Sn, Ga, P, S, In, As, Tl and Cd, and combinations thereof; and X being carbon, nitrogen, or a combination thereof. Examples of these types of ternary or "MAX" ceramic materials are described, e.g., in U.S. Pat. Nos. 6,231,969, and 6,497,922, the contents of these documents being incorporated by reference herein, in their entireties.

The ceramic materials can include any of a variety of different combinations of the M, A, and X elements, and the different elements can be present in the ceramic material in various relative amounts on an atomic basis. Some examples of MAX ceramic material are referred to as "2-1-1 phase" ceramics, which means that the atomic ratios of elements M:A:X are 2:1:1. Other examples are referred to as "3-1-2 phase" ceramics, which means that the atomic ratios of elements M:A:X are 3:1:2. Some example ceramic materials can have only a single type of each of the M, A, and X element in the material, e.g., a single type of each of M, A, and X. Other examples may include a combination of different elements for one or more of the M, A, and X elements. In this respect, a MAX ceramic material for use in a mold as described may include only Si or only Al as the A element, or may include a mixture of both Si and Al for the A element. Similarly, a MAX ceramic for use in a mold as described may include only N or only C as the X element, or may alternately include a mixture of both N and C for the X element.

As more specific examples of these ceramic materials, certain MAX ceramic materials that may be useful in a mold as described, of the "2-1-1 phase" type, include those of formula (I):

$$M_2A_1X_1 \qquad (I).$$

In formula (I), M is at least one transition metal; A is selected from Si, Al, Ge, Pb, Sn, Ga, P, S, In, As, Tl and Cd, and combinations thereof; and X is carbon, nitrogen, or a combination thereof.

Certain MAX ceramic materials that may be useful in a mold as described, of the "3-1-2 phase" type, include those of formula (II):

$$M_3A_1X_2 \qquad (II).$$

In formula (II), M is at least one transition metal; A is selected from one of Al, Ge, and Si, and combinations thereof; and X is carbon, nitrogen, or a combination of carbon and nitrogen.

Examples of useful transition metals include titanium, niobium, zirconium, hafnium, chromium, tantalum, molybdenum, vanadium, and scandium.

Example ceramic materials of a mold as described may be made of the ceramic material of formula (I), of the ceramic material of formula (II), or may include a combination of the ceramic material of formula (I) and the ceramic material having formula (II).

Useful and preferred ceramic materials for use as a mold surface of a glass mold as described herein are those that will be effective to act as a surface of a glass mold to provide a surface that does not stick to glass; that can be formed (e.g., by machining) into a mold body having mold surfaces, or alternately deposited onto a mold body having mold surfaces; and that are sufficiently heat and oxidation resistant to be contacted with softened glass over multiple (hundreds or thousands of) glass molding cycles without developing an undue amount of cracks, dimples, asperities, or other imperfections. Examples ceramic materials include $Ti_3SiC_2$, $Ti_2SiC$, $Ti_3AlC_2$, $Ti_2AlC$, $Ti_3SiN_2$, $Ti_2SiN$, $Ti_3AlN_2$, $Ti_2AlN$ or a combination thereof.

In certain example molds, the ceramic material at a surface of the mold comprises, consists essentially of, or consists of the elements of the MAX material. Example ceramic materials may contain at least 80, 90, or 95 atomic percent of M, A, and X elements, and not more than 5, 10, or 20 atomic percent of other elements. A ceramic material that consists essentially of the MAX material is a ceramic material that includes as least 98, 99, 99.5, or 99.9 atomic percent of M, A, and X elements and not more than 0.1, 0.5, 1, or 2 atomic percent of other elements.

The mold may be made of the ceramic material only, i.e., may be made of a bulk piece of the ceramic material formed into a mold body. In these embodiments, a bulk piece of the ceramic material may be produced and machined to form a desired mold body with mold features selected to produce a particular shaped glass item.

In other example embodiment, a mold may include a mold body made of a material that is different from the ceramic material, such as graphite or another material that can be formed into a mold body, with a layer of the ceramic being coated (i.e., "deposited") onto mold features of the mold body.

According to certain presently preferred examples, a mold of the description includes a graphite mold body that has surfaces that include a deposited ceramic material as described herein. The deposited ceramic material is effective to inhibit the amount of oxidation that occurs to graphite of the mold body during use of the mold, at high temperature, to form or shape softened glass. The ceramic material itself is also resistant to oxidation. The oxidation-resistant ceramic material at the surface reduces the amount of oxidation of the mold that occurs during use, which effectively extends the useful lifetime of the mold. A mold that includes a surface with a ceramic material as described can be used to produce a greater number of shaped glass items during a useful lifetime of the mold, as compared to molds that have a surface made of a less oxidation-resistant material.

Examples of useful and preferred molds as described can be made of a graphite mold body with a layer of ceramic material deposited over the outer surface of the graphite mold body. The mold body includes one or more mold features and is shaped and adapted to be used to form a three-dimensional article (i.e., a "shaped glass item") from softened glass that is placed into the mold body to contact the one or more mold features, e.g., of a mold cavity. A preferred mold body can be used repeatedly to form multiple shaped glass items, e.g., many hundreds or thousands of shaped glass items. A "mold feature" may be or may include a cavity, a recess, a flat surface, a cornered surface, a protrusion, or a combination of these, such as a cavity that includes one or more protrusions, a three-dimensional cavity that includes one or more openings or recesses, a rectangular cavity defined by a flat surface bordered at a perimeter by edges or corners, or any other features used to form a shaped glass item.

The layer of ceramic material may be deposited at least over all mold features, meaning all surfaces of the mold body that are used to contact and form a shaped glass item. In certain embodiments, the layer of ceramic material covers all surfaces of the mold body, including mold features and all non-mold feature surfaces, i.e., "encapsulates" the mold body.

A preferred mold body may be made of—e.g., comprise, consist essentially of, or consist of—fine-grain graphite. As used generally herein, a mold body that "consists essentially of" a specified material or combination of materials (e.g., fine-grain graphite) is a mold body that contains the specified material or combination of materials and not more than an insignificant amount of any other material, e.g., not more than 1 percent by weight, preferably not more than 0.5, 0.1, or 0.01 percent by weight of another material.

As used herein, "fine-grain graphite" refers to graphite stock or ingot that comprises, consists of, or consists essentially of graphite particles (grains) with sizes that do not exceed 10 microns. In some embodiments the graphite particle sizes (grain sizes) of the fine-grain graphite may be on the order of 1 micron in size. In other embodiments, the graphite particle (grain) sizes may be on the order of 5 microns in size, and in still other embodiments, the graphite particle (grain) sizes may be on the order of 10 microns. It will be recognized that in various embodiments the grain size of the graphite may fall substantially within a limited range of a grain size distribution, e.g., in a range of from 1 to 10 microns, or a range of from 2 to 10 microns, 2 to 8 microns, 1.5 to 6.5 microns, or over another suitable range. It may be preferred to use graphite stock or ingot having a uniform or substantially uniform grain size, so that the coefficient of thermal expansion (CTE), as well as other performance characteristics of a mold body made from the graphite, are as isotropic and homogeneous as possible.

Fine-grain graphite particles having selected grain size, including a useful or preferred grain size or grain size distribution as described herein, can be prepared by known methods and are also available from commercial sources. Grain size may be selected by sieving graphite particles using standard sieves to achieve a desired particle size. A non-limiting example of graphite with a (fine) grain size of about 10 microns or less is commercially available from Poco Graphite, Decatur, Tex., USA under the trademark Glassmate-LT®.

In preferred examples, graphite of the graphite body can be purified to reduce contaminants and form a high purity graphite body, as described for example in U.S. Pat. No. 3,848,739, wherein a graphite mold body or graphite stock body is placed within a purification furnace in which the body is contacted by a halogen-containing gas for a period of time and at a temperature sufficient to permit penetration of the halogen into the graphite body, to cause the halogen to react with and volatilize inorganic impurities and to expel such impurities from the graphite. Particularly preferred graphite can be purified to contain less than 5 parts per million (by weight) of inorganic impurities as measured by a standard ash test.

In example molds having a layer of the ceramic material coated onto a mold body of another material, e.g., graphite, the thickness of the layer may be any useful or desired thickness. The thickness of the layer of ceramic material can be a thickness that is useful to provide desired performance of the mold, such as desired anti-stick performance, resistance to oxidation of an underlying graphite surface and of the layer of ceramic material, and durability in the form of a useful or extended lifetime for use of the mold as a precision glass-forming mold, to form precision glass items. In some examples a thickness is chosen to reduce oxidation of the underlying graphite. In various embodiments, the thickness of the ceramic material layer can be greater than or equal to 10 nanometers and less than or equal to 500,000 nanometers, i.e., 10 nm<thickness<500,000 nm, e.g., a thickness in a range from 50 to 500 nanometers or from 100 to 300 nanometers. Any other coating thickness may also be used, as is considered to be useful and suitable for a desired glass-forming mold or a selected portion or segment of a glass-forming mold.

The ceramic material may be deposited onto the mold body by any of various useful methods known to prepare ceramic layers or ceramic coatings onto a substrate (in this case, a mold body). Examples include by chemical vapor deposition, atomic layer deposition, physical vapor deposition (including reactive physical vapor deposition), spray coating, aerosol deposition, etc. Examples of these types of coating and deposition methods are well known, and can be adapted to forming a ceramic material as described herein. See, for example, the methods described in U.S. Pat. Nos. 6,497,922 and 6,231,969.

A ceramic material layer may preferably be disposed over the entire surface of a mold body, e.g., to entirely cover (e.g., encapsulate) the mold body to inhibit oxidation of all surfaces of a graphite of the mold surface. This allows the glass mold to be made from inexpensively machined graphite. It can be important, however, that the ceramic material layer does not become removed from the graphite surface during use, for example when contacted with softened glass that is solidified and subsequently removed from contact with the surface. To prevent the ceramic material from being removed upon contact with softened glass and subsequent removal of the solidified glass, the ceramic material can have a coefficient of thermal expansion (CTE) that is a close match to the CTE of the underlying mold body. Approximately equal coefficients of thermal expansion of the underlying mold body and the ceramic material layer will prevent a difference in thermal expansion of the ceramic material relative to the mold body during contact with softened glass and solidification and removal of the solidified glass, so that the ceramic material layer exhibits good adhesion to the graphite mold body surface.

Preferably, the ceramic material can have a coefficient of thermal expansion that differs from the coefficient of thermal expansion of a mold body by an amount that does not exceed one part per million/° C. from (greater than or less than) the CTE of the mold body, wherein both the CTE of the ceramic material and the CTE of the mold body are measured by the same technique in the same units. A CTE differential of one part per million/° C. or less reduces the susceptibility of the ceramic material layer to differential thermal expansion and contraction effects that would otherwise cause the ceramic material layer to be susceptible to delamination from the surface of the mold body, i.e., at a larger CTE differential between the ceramic material layer and the material (e.g., graphite) of the mold body. For example, a fine-grained graphite body used to prepare a glass-forming mold body as described can advantageously have a coefficient of thermal expansion (CTE) that is in a range of from 7 to 9 parts per million/° C.; a preferred difference between the respective CTE values of the ceramic material and the graphite body can be not more than one part per million/° C., preferably less than 0.75 ppm/° C., and more preferably is less than 0.5 ppm/° C.

For preferred molding applications, the ceramic material of a mold surface can be sufficiently smooth that softened glass does not stick to the mold surface during use, including during contacting softened glass with the coated surface, allowing the softened glass to solidify, followed by removal of the solidified glass from the surface. In addition, a preferred ceramic material surface can have a surface roughness that that is sufficiently smooth to produce a "precision molded" glass item. For example, a ceramic material at a surface of a mold, e.g., a mold feature surface, may preferably have a surface roughness that does not exceed about 25 microns in deviation from the average surface plane of the mold, e.g., that does not exceed about 20, 15, or 10 microns in deviation from the average surface plane of a surface of the mold. This level of smoothness of a mold surface can allow the mold to be useful to produce shaped glass items (e.g., "precision molded" or "precision" shaped glass items) that can be used to make a cover glass for various consumer electronic devices such as cellular phones, tablet computers, MP3 players, ATM machines, medical instruments, televisions, touch screen displays, optical devices, etc.

It will be appreciated that the surface of the mold body may also or alternately be characterized in other terms, e.g., with reference to root mean square roughness or other parameterizing characteristics, to specify a surface of a mold body that has a desirably smooth molding surface. A surface finish or smoothness of a ceramic material surface of a mold can be measured mechanically with commercially available profilometers or laser devices. The mold surface can also be indirectly evaluated by examining light-scattering characteristics of surfaces of shaped glass items produced by the mold.

The relevant surface of a mold that is smooth as described need not be measured as the entire surface of a mold or of a particular mold feature. A surface that exhibits a desirably smooth finish as described may be measured as a surface that is a portion of a mold body or a portion of a mold feature, such as a portion having a size of, e.g., 1 square centimeter, 2, 5, or 10 square centimeters. Alternately, an entire ceramic material mold surface that contacts glass during a glass forming step may be smooth as described, and substantially free of surface deviations. For forming a shaped glass item that is a cover glass, an entire flat surface, or a portion of a flat surface used to form the cover glass (e.g., a 1 square centimeter surface, or a 2, 5, or 10 square centimeter-sized surface of a flat surface of a mold surface of the mold), can be substantially free of surface discontinuities, e.g., have a surface roughness as described.

A mold of the present description can be used for molding shaped glass items, e.g., for molding precision shaped glass items, by steps that include contacting the ceramic material surface of the mold with softened glass, allowing the softened glass to solidify within the mold, and removing the solidified glass from the surface and the mold. The type of glass that is molded by contact with the ceramic material mold surface may generally be any glass suitable for forming into a three-dimensional shaped glass item. In some example embodiments, the glass may be ion-exchangeable aluminosilicate glass. In this example, after removing the shaped glass item from the mold, the shaped glass item is contacted with molten salt, e.g., by dipping the shaped glass item into a molten salt bath which may be at a temperature of at least 300 or 400 degrees Fahrenheit. During contact between the ion-exchangeable aluminosilicate glass and the molten salt, heat causes potassium ions from the bath to become infused into the glass at the surface, replacing sodium ions at the surface, which exit the glass. The potassium ions are larger in size compared to the sodium ions that are being replaced. The glass then cools with the potassium ions contained in the glass, at the glass surface.

Often, or typically, a step of forming a molded glass item using a mold as described is performed in an atmosphere that contains a reduced or very low level of oxygen, e.g., an atmosphere of an inert gas that contains less than 5, 1, 0.5, or 0.1 percent oxygen or less. An example of such as an atmosphere is an atmosphere of highly concentrated nitrogen, e.g., an atmosphere of at least 90, 95, 99, 99.5, or 99.9 percent nitrogen. Removal of oxygen from the atmosphere of the molding step prevents oxidation that would otherwise occur at a surface of the mold, or of a graphite of a mold body, in the presence of oxygen or higher levels of oxygen. Desirably, to reduce the cost and effort required to provide a low-oxygen atmosphere in which to perform the molding step, a mold that includes surfaces of ceramic material as described may be sufficiently resistant to oxidation to allow the mold to be used in an atmosphere that is not specifically prepared with low or very low levels of oxygen, for example an atmosphere of air, or an atmosphere that contains relatively higher levels of oxygen that have been required for use in past glass molding steps.

Preferably, the method can be used to form high strength, scratch-resistant precision shaped alkali-aluminosilicate glass items that have surfaces of very high smoothness, e.g., surfaces that are substantially free of wrinkles, dimples, cavities, protrusions, and other surface discontinuities and asperities that are not desired or intended features of the shaped glass item. Preferred examples of this type of shaped glass item may have a surface roughness that does not exceed about 25 microns in deviation from an average surface plane of a surface of the shaped glass item, e.g., that does not exceed about 20, 15, or 10 microns in deviation from the average surface plane of the shaped glass item. This level of smoothness of a shaped glass item surface is a level of smoothness suitable for a shaped glass item that is a cover glass for various consumer electronic devices such as cellular phones, medical instruments, televisions, touch screen displays, optical devices, etc.

The relevant surface of a shaped glass item that is desirably smooth as described need not be assessed as an entire outer surface of an item, or an entire surface of a particular feature of the item (e.g., an entire flat surface). A surface that exhibits a desirably smooth finish as described may be measured as the entire surface of a shaped glass item, or may alternatively be measured as a portion of the total surface of the shaped glass item, such as a portion having a size of, e.g., 1 square centimeter, 2, 5, or 10 square centimeters. For a shaped glass item that is a cover glass, an entire flat surface, or a portion of a flat surface of the cover glass cover glass (e.g., a 1 square centimeter surface, or a 2, 5, or 10 square centimeter-sized surface of a flat surface of a mold surface of the mold), can be substantially free of surface discontinuities as described, e.g., can have a surface roughness that does not exceed about 25 microns in deviation from the average surface plane of the flat surface, e.g., that does not exceed about 20, 15, or 10 microns in deviation from the average surface plane of the flat surface.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A mold comprising a graphite mold body having one or more mold features having a surface comprising:

ceramic material having formula (I):

$$M_2A_1X_1 \qquad (I)$$

wherein
M is at least one transition metal,
A is selected from Si, Al, Ge, Pb, Sn, Ga, P, S, In, As, Tl and Cd, and
combinations thereof, and
X is carbon, nitrogen, or a combination thereof;
ceramic material having formula (II):

$$M_3A_1X_2 \qquad (II)$$

wherein
- M is at least one transition metal,
- A is selected from one of Al, Ge, and Si, and combinations thereof, and
- X is carbon, nitrogen, or a combination thereof; or ceramic material that includes a combination of ceramic material having formula (I) and ceramic material having formula (II), wherein the ceramic material has a coefficient of thermal expansion that differs from a coefficient of thermal expansion of the graphite mold body by 1 part per million/° C. or less.

2. The mold of claim 1, wherein the ceramic material includes at least 95 atomic percent of the elements M, A, and X.

3. The mold of claim 1, wherein A is selected from silicon, aluminum, and a combination thereof.

4. The mold of claim 1, wherein the ceramic material is $Ti_3SiC_2$, $Ti_2SiC$, $Ti_3AlC_2$, $Ti_2AlC$, $Ti_3SiN_2$, $Ti_2SiN$, $Ti_3AlN_2$, $Ti_2AlN$, or a combination thereof.

5. The mold of claim 1, wherein the one or more mold features are adapted to form a precision shaped glass item.

6. The mold of claim 5, wherein the one or more mold features include a surface having a surface roughness that does not exceed about 25 microns in deviation from an average surface plane of the surface of the mold feature.

7. The mold of claim 6, wherein the precision shaped glass item is a cover glass of an electronic device, and the surface having the surface roughness is a flat surface.

8. The mold of claim 1 with aluminosilicate glass in contact with the one or more mold features.

9. A method of forming a shaped glass item, the method comprising:
- softening aluminosilicate glass, and
- placing the softened aluminosilicate glass in contact with one or more mold features of a mold to form the shaped glass item,
- wherein the mold comprises a graphite mold body having the one or more mold features and having a surface comprising:
- ceramic material having formula (I):

$$M_2A_1X_1 \qquad (I)$$

wherein
- M is at least one transition metal,
- A is selected from Si, Al, Ge, Pb, Sn, Ga, P, S, In, As, Tl and Cd, and combinations thereof, and
- X is carbon, nitrogen, or a combination thereof;

ceramic material having formula (II):

$$M_3A_1X_2 \qquad (II)$$

wherein
- M is at least one transition metal,
- A is selected from one of Al, Ge, and Si, and combinations thereof, and
- X is carbon, nitrogen, or a combination thereof; or ceramic material that includes a combination of ceramic material having formula (I) and ceramic material having formula (II), wherein the ceramic material has a coefficient of thermal expansion that differs from a coefficient of thermal expansion of the graphite mold body by 1 part per million/° C. or less.

10. The method of claim 9 further comprising removing the shaped glass item from the mold and contacting the shaped glass item with molten salt.

11. The method of claim 9, wherein the shaped glass item has a flat surface formed by contact with a flat mold feature, the flat surface having a surface roughness that does not exceed about 25 microns in deviation from an average surface plane of the flat surface.

12. The method of claim 9, wherein the softened aluminosilicate glass is placed in contact with the one or more mold features of the graphite mold body while the graphite mold body and the softened aluminosilicate glass are in a concentrated nitrogen atmosphere.

13. A method of forming a mold comprising a graphite mold body and a ceramic material surface, the method comprising:
depositing onto the graphite mold body:
ceramic material having formula (I):

$$M_2A_1X_1 \qquad (I)$$

wherein
- M is at least one transition metal,
- A is selected from Si, Al, Ge, Pb, Sn, Ga, P, S, In, As, Tl and Cd, and combinations thereof, and
- X is carbon, nitrogen, or a combination thereof;

ceramic material having formula (II):

$$M_3A_1X_2 \qquad (II)$$

wherein
- M is at least one transition metal,
- A is selected from one of Al, Ge, and Si, and combinations thereof, and
- X is carbon, nitrogen, or a combination thereof; or ceramic material that includes a combination of ceramic material having formula (I) and ceramic material having formula (II), wherein the ceramic material has a coefficient of thermal expansion that differs from a coefficient of thermal expansion of the graphite mold body by 1 part per million/° C. or less.

14. The method of claim 13, wherein the ceramic material includes at least 95 atomic percent of the elements M, A, and X.

15. The method of claim 13, wherein A is selected from silicon, aluminum, and a combination thereof.

16. The method of claim 13, wherein the ceramic material is $Ti_3SiC_2$, $Ti_2SiC$, $Ti_3AlC_2$, $Ti_2AlC$, $Ti_3SiN_2$, $Ti_2SiN$, $Ti_3AlN_2$, $Ti_2AlN$, or a combination thereof.

17. The method of claim 13 comprising:
- forming the graphite mold body by machining a piece of bulk graphite into the graphite mold body containing one or more mold features at a surface of the graphite mold body, and
- depositing the ceramic material onto the one or more mold features by: chemical vapor deposition, atomic layer deposition, physical vapor deposition, reactive physical vapor deposition, spray coating, or aerosol deposition.

18. The method of claim 13, wherein the deposited ceramic material encapsulates the graphite mold body.

19. The method of claim 18, wherein the one or more mold features deposited with ceramic material include a flat surface that has a surface roughness that does not exceed about 25 microns in deviation from an average surface plane of the flat surface.

* * * * *